United States Patent
Chang et al.

(10) Patent No.: US 6,651,313 B1
(45) Date of Patent: Nov. 25, 2003

(54) METHOD FOR MANUFACTURING A MAGNETIC HEAD

(75) Inventors: Thomas Young Chang, San Jose, CA (US); Michael Andrew Parker, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 09/684,227

(22) Filed: Oct. 6, 2000

(51) Int. Cl.[7] .......................... G11B 5/127; H04R 31/00
(52) U.S. Cl. .................. 29/603.15; 29/603.07; 29/603.12; 29/603.13; 29/603.16; 216/64; 216/66; 360/121; 360/122; 360/123
(58) Field of Search .................... 29/603.01, 603.07, 29/603.12, 603.13, 603.15, 603.16, 603.18; 216/64, 66; 360/121, 122, 123, 119

(56) References Cited

U.S. PATENT DOCUMENTS

| | | | |
|---|---|---|---|
| 4,192,985 A | | 3/1980 | Berghof et al. ............. 219/121 |
| 5,200,056 A | * | 4/1993 | Cohen et al. ............... 205/122 |
| 5,250,150 A | * | 10/1993 | Gaud et al. ................. 156/647 |
| 5,382,484 A | * | 1/1995 | Hosono ......................... 430/5 |
| 5,443,931 A | * | 8/1995 | Watanabe ..................... 430/5 |
| 5,483,735 A | * | 1/1996 | Postma et al. ................ 29/603 |
| 5,613,293 A | * | 3/1997 | Slade et al. .............. 29/603.12 |
| 5,615,069 A | | 3/1997 | Slade et al. ................. 360/126 |
| 5,639,699 A | * | 6/1997 | Nakamura et al. .......... 438/238 |
| 5,675,461 A | | 10/1997 | Aylwin et al. ............... 360/126 |
| 5,737,826 A | * | 4/1998 | Slade et al. .............. 29/603.15 |
| 5,798,529 A | * | 8/1998 | Wagner .................. 250/492.21 |
| 5,840,630 A | * | 11/1998 | Cecere et al. ............... 438/712 |
| 5,877,122 A | * | 3/1999 | Ishimaru et al. ............ 505/190 |
| 5,902,702 A | * | 5/1999 | Nakao et al. ................... 430/5 |

FOREIGN PATENT DOCUMENTS

EP    0 874 355 A2    10/1998

OTHER PUBLICATIONS

Annotated photograph illustrating use of Micrion ion milling device dated Mar. 9, 1998.

* cited by examiner

Primary Examiner—Peter Vo
Assistant Examiner—Paul D Kim
(74) Attorney, Agent, or Firm—Robert O. Guillot; IPLO Intellectual Property Law Offices

(57) ABSTRACT

In the present method for manufacturing a magnetic write head a focused ion beam (FIB) tool is utilized to mill the side edges of a P2 pole, in order to provide a narrowed track width. Prior to milling, a thin film layer of material is deposited upon the P2 pole tip. The milling boxes of the FIB tool are properly aligned upon the layer with reference to the location of the P2 pole tip. Milling of the lateral edges of the P2 pole tip is then conducted to the appropriate depth, and the layer of material is removed. The resulting P2 pole tip has sharp lateral edges, rather than the rounded edges that are produced in prior art FIB processing methods that do not utilize the thin film layer. In a preferred implementation, the FIB tool is utilized first to deposit the thin film layer and thereafter to perform the milling operation.

20 Claims, 3 Drawing Sheets

METHOD FOR MANUFACTURING A MAGNETIC HEAD

BACKGROUND OF THE INVENTION

1. Field of the Invention

The present invention relates generally to thin film magnetic heads used to read and write data onto magnetic media, and more particularly to the use of ion milling, such as with the use of a focused ion beam (FIB) tool, to trim the pole tip lateral edges to achieve a narrow track width.

2. Description of the Prior Art

Thin film magnetic recording heads are generally utilized in the data storage industry to record data onto magnetic media, such as magnetic hard disks. It is an industry-wide goal to store ever increasing quantities of data upon the magnetic media by increasing the areal density of the data stored on the media. The areal data storage density is typically increased by increasing the linear density of the data bits (bits per inch, BPI), and/or by writing the data in narrower tracks (tracks per inch, TPI). With regard to hard disks, where the data is written in narrower circular tracks on the disk, more data tracks per inch can be written and therefore more data can be stored on the disk when the TPI is increased.

The width of the data track that is written by a recording head is generally determined by the width of the second magnetic pole, termed the P2 pole, of the write head, and efforts have been undertaken in the prior art to devise methods for reducing the width of the base of the P2 pole, commonly referred to as the P2B dimension. These prior art methods have included the use of ion beams to irradiate selected areas of the P2 pole to remove material and thereby reduce the P2B dimension.

With particular regard to the present invention, the use of a focused ion beam (FIB) to mill portions of the P2 pole to reduce the P2B dimension is known. Such prior art efforts have indeed reduced the P2B dimension, however the use of the FIB tool, particularly where the P2B dimension is quite small can be problematic. Specifically, owing to the current density distribution within the FIB tool ion beam, the edges of a milled P2 pole tip are rounded, rather than being sharp edges. The rounded edges of the P2 pole result in a P2B dimension that is unpredictable and a P2 pole that is non-optimum. There is therefore a need for an improved method for conducting the FIB milling of the write head which results in a P2 pole having sharp milled lateral edges and a clearly defined P2B dimension. Where the milled lateral edges of the P2 pole are sharp, a clearly defined track width is created and unwanted side writing from the pole tip is significantly reduced, such that narrower data tracks are produced and the data tracks can be written closer together, thus resulting in increased TPI and increased areal density of the data upon the magnetic media.

SUMMARY OF THE INVENTION

In the present method for manufacturing a magnetic head a focused ion beam (FIB) tool is utilized to mill the side edges of a P2 pole, in order to provide a narrowed track width. Prior to milling, a thin film layer of material is deposited upon the air bearing surface (ABS) including the P2 pole tip. The milling boxes of the FIB tool are properly aligned upon the layer with reference to the location of the P2 pole tip, and milling of the lateral edges of the P2 pole tip is then conducted to the appropriate depth. The layer of material is then removed. The resulting P2 pole tip has sharp lateral edges, rather than the rounded edges that are produced in prior art FIB processing methods that do not utilize the thin film layer. In a preferred implementation, a hardened photoresist is utilized to form the thin film layer. However, in an alternative embodiment the FIB tool is utilized first to deposit the thin film layer and thereafter to perform the milling operation.

It is an advantage of the present invention that the areal density of data written on magnetic media is increased.

It is another advantage of the present invention that the track width of data written on magnetic media is decreased.

It is a further advantage of the present invention that side writing from a pole tip is reduced.

It is a yet another advantage of the present invention that data tracks can be written closer together upon magnetic media.

It is yet a further advantage of the present invention that the focused ion beam milling of the lateral edges of pole tips results in sharp edges of the milled sides of the pole tip.

It is still another advantage of the present invention that a thin film is deposited upon a pole tip in selected areas, such that the milling boxes of the FIB tool can be accurately aligned relative to the pole tip structures.

It is still a further advantage of the present invention that the ion milling step does not create pole tip recession, as the upper surface of the pole tip is not exposed to the ion beam during the milling step.

These and other objects and advantages of the present invention will become well understood by those skilled in the art upon reading the following detailed description which makes reference to the several figures of the drawing.

IN THE DRAWINGS

DETAILED DESCRIPTION OF THE PREFERRED EMBODIMENTS

Figure 1:
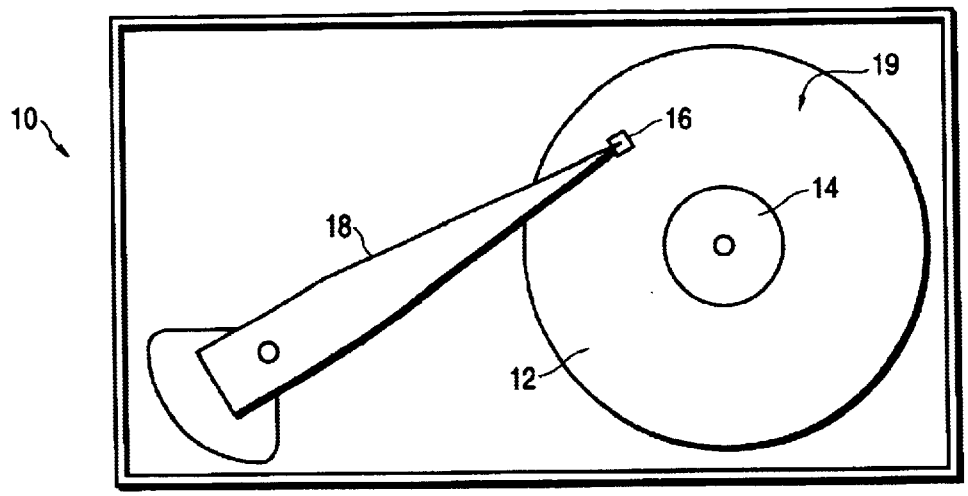
FIG. 1 is a top plan view of a hard disk drive of the present invention including a magnetic head of the present invention.

The magnetic heads of the present invention are utilized to read and write data to magnetic media, such as hard disks in hard disk drive devices. A simplified top plan view of a hard disk drive 10 is presented in FIG. 1, wherein at least one magnetic media hard disk 12 is rotatably mounted upon a spindle 14. A magnetic head 16, typically termed a slider, of the present invention, is mounted upon an actuator arm 18 to fly above the surface 19 of each rotating hard disk 12, as is well known to those skilled in the art. It is an object of the magnetic head 16 of the present invention to achieve a high areal data storage density on the magnetic media 12.

To achieve high density areal data storage on magnetic media 12 it is necessary to record data in narrow bands, termed tracks, on the magnetic media. Generally, the track width is determined by the width of the magnetic poles of the magnetic head 16, and the present invention relates to the use of ion milling in particular by use of a focused ion beam tool to trim the lateral edges of the poles to thereby achieve narrower poles and thus a narrower track width. Where the data tracks are narrower, more tracks per inch (TPI) can be recorded, thus achieving a higher areal data storage density.

Figure 2:
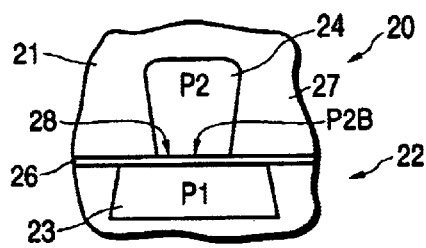
FIG. 2 is a top plan view of a typical pole tip as is well known in the industry.

FIG. 2 is a plan view of a portion of a prior art pole tip structure of a magnetic head configuration 20 that is well known in the industry. As depicted therein, the magnetic head 20 includes thin film layers that are typically deposited proximate the rear edge of the air bearing surface (ABS) 21 of the head 20. The magnetic head 20 includes a write head element 22 having a first magnetic pole 23 (P1) and a second magnetic pole (P2) having a pole tip 24. The P1 pole and P2 pole tip are separated by a thin film write gap layer 26 composed of a non-magnetic material, and the P1 pole, the P2 pole and the write gap layer are exposed on the ABS surface 21 of the head 20. Generally, the width of the written data track on the magnetic media is determined by the width of the base 28 of the P2 pole tip 24, typically known as the P2B dimension. Therefore, the present invention is primarily directed towards reducing the P2B dimension of the P2 pole tip 24, such that the track width can be reduced, and the TPI (and thus the areal data storage density on the disk) can be thereby increased.

Figure 3:
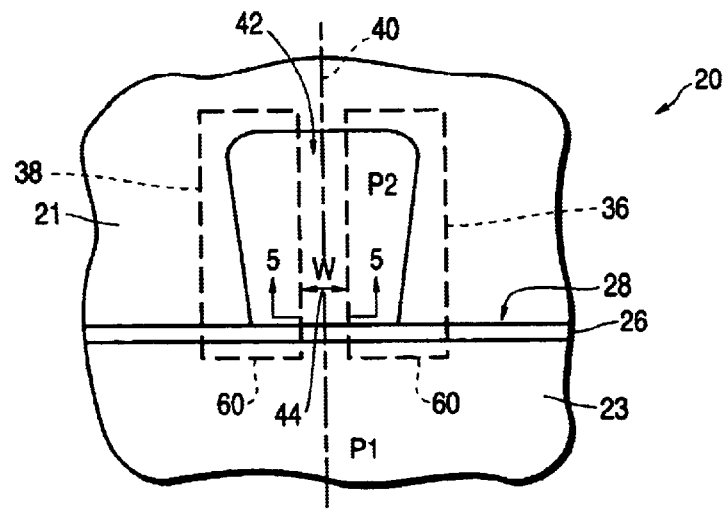
FIG. 3 is an enlarged view of the pole tip depicted in FIG. 2 showing FIB tool milling boxes disposed thereon.

FIG. 3 is an enlarged view of FIG. 2 having superimposed focused ion beam milling areas, termed milling boxes, shown thereon in phantom. More specifically, as depicted in FIG. 3, a first generally rectangular focused ion beam milling box 36 and a second focused ion beam milling box 38 overlay the P2 pole tip 24 in a generally symmetrical manner about the center line 40 of the P2 pole tip. The milling boxes 36 and 38 outline rectangular areas on the ABS surface 21 in which the ion beam of a focused ion beam tool will be directed in a raster-like manner to remove write head material. It is therefore to be understood that following the usage of the FIB tool that the remaining central portion 42, and importantly base portion 44 of the P2B base 28, of the P2 pole tip located between the milling boxes 36 and 38 will remain unmilled. The width W of the base portion 44 of the milled P2 pole tip 24 will then primarily determine the track width of the head 20 following the FIB tool milling. It is also significant to note that the lower portion 60 of the milling boxes 36 and 38 can be extended into the P1 pole 23 to notch the P1 pole, thereby increasing the performance of the head 10, as is known to those in the art. The use of a FIB tool and the milling box configuration shown in FIG. 3, to trim the lateral edges of the P2 pole tip, and to notch the P1 pole is prior art that is known to those skilled in the art.

Figure 4:
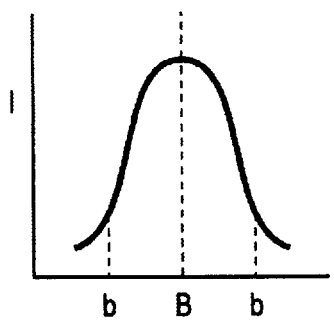
FIG. 4 is a graph generally illustrating the current distribution of a FIB tool ion beam.

In attempting to create narrow track widths through the use of FIB tool milling of the P2 pole tip, certain limitations have been reached. Specifically, as depicted in FIG. 4, the current density distribution I around the center B of the ion beam of the FIB tool has a generally Gaussian distribution, such that the edges b of the ion beam have a generally reduced current density as compared to the central portions B of the beam. As a result, the focused ion beam does not remove material, or cut, in a precise straight edge. Rather, the cut edge is somewhat rounded, which can result in inefficient data writing by the magnetic head, as is next discussed.

Figure 5:
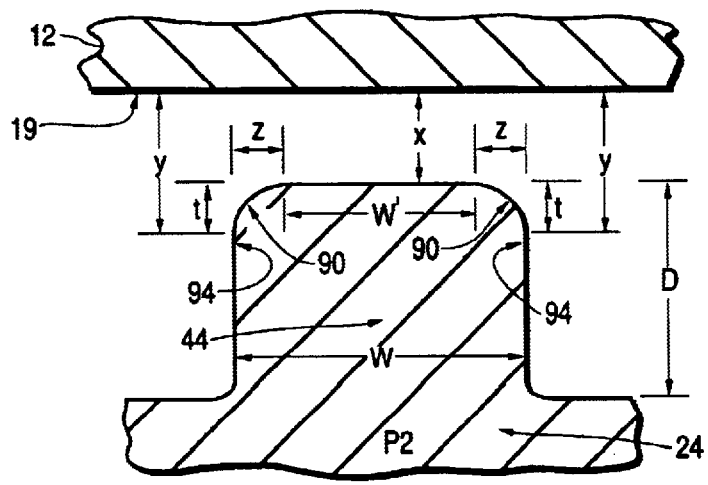
FIG. 5 is a side cross-sectional view of a milled P2 pole tip of the prior art, taken along lines 5—5 of FIG. 3.

FIG. 5 is a cross sectional view taken along lines 5—5 of FIG. 3 proximate the base portion 44 of the P2 pole tip that remains after a prior art FIB milling process to a depth D. The milled P2 pole tip is shown in an operational setting proximate the surface 19 of a magnetic media hard disk 12. The milled base portion 44 of the P2 pole tip of FIG. 5, results from a FIB tool beam having the typically Gaussian current density distribution depicted in FIG. 4. The significant deleterious features of the P2 pole tip depicted in FIG. 5 are the rounded edges 90 of the pole tip that result from the FIB milling process. In particular, the rounded edges 90 of the projecting base portion 44 of the P2 pole tip result in media writing inefficiencies that the present invention described below seeks to improve. Specifically, where the nominal gap distance from the P2 pole tip base portion 44 to the media surface 19 is denoted as x, at the edges 94 of the pole tip base 44 the gap distance is y owing to the increased distance t of the rounded edges 90 at each edge 94 of the pole tip. This increase in the gap distance (from x to y) results in a weakening of the write signal transmitted to the media 12 and also increases unwanted side writing from the pole tip. As is known, pole tip side writing necessarily increases the spacing between tracks on magnetic media, thereby acting as a limiting factor in increasing the TPI and thus the areal data storage density that can be achieved. Additionally, the rounded edges 90 cause a reduction in the desired pole tip width W by an amount z on each side of the pole tip 44, such that a reduced effective pole tip width W' is created that has the expected nominal gap distance x to the media surface 19. The notches that are cut into the P1 pole 23 through the lower ends 60 of the milling boxes 36 and 38 (as depicted in FIG. 3) will also have problematic rounded edges (not shown). Additionally, although not shown in FIG. 5, the prior art P2 pole FIB milling process results in some exposure of the ABS surface 21 of the head 20 to the focused ion beam, thus resulting in some milling of the ABS surface 23 of the head 20 and a recession of the P1 pole, P2 pole tip and other important components (not shown) relative to the ABS surface. The pole tip recession can result in degrading the performance of the magnetic head 20.

It is therefore to be understood that significant limitations exist in the prior art methods for using a FIB tool to mill the P2 pole tip, particularly where the width W of the unmilled base portion 44 of the P2 pole tip is small enough to be comparable to the dimension z of the rounded edges 90 that result from the use of the FIB tool having the generally Gaussian current density distribution of its beam. As described below, the present invention results in the elimination of the rounded edges 90 of the pole tip 44 when using a FIB tool, thereby providing an improved pole tip trimming process that results in an improved pole tip, and thus an improved magnetic head 16 of the present invention for a disk drive 10.

Figure 6:
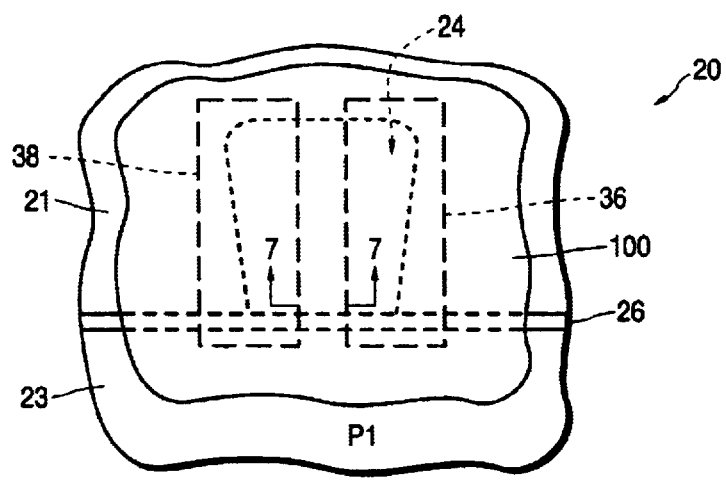
FIG. 6 is a top plan view of a pole tip, similar to FIG. 2, having a FIB milling layer of the present invention deposited thereon.
Figure 7:
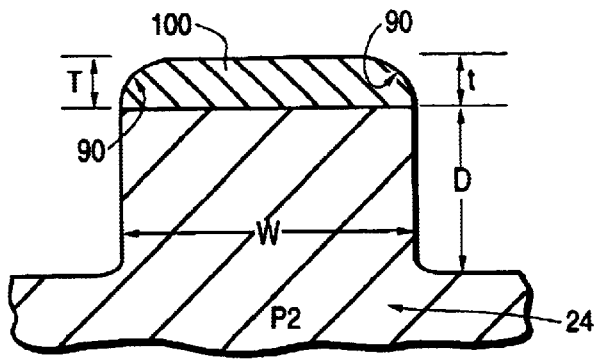
FIG. 7 is a side cross-sectional view taken along lines 7—7 of FIG. 6 of the FIB milled P2 pole of the present invention.

A first step of the present invention is the deposition of a thin film layer 100 upon the pole tip ABS surface 21 of the prior art head 20, as is depicted in FIGS. 6 and 7, wherein FIG. 6 is a plan view similar to FIG. 3 and FIG. 7 is a cross-section view, similar to FIG. 5. Specifically, FIG. 6 depicts the prior art magnetic head 20 having a surface layer 100 of the present invention deposited thereon, such that the features of the head 20, such as the P2 pole tip 24, are shown in phantom. Additionally, the FIB tool milling boxes 36 and 38 are shown disposed in the identical location to that shown in FIG. 3. Following the deposition of the protective layer 100, the FIB tool is utilized to mill the areas within the milling boxes 36 and 38, as was done in the prior art. The improvement that results from the protective layer 100 of the present invention is best seen in FIG. 7. Specifically, the rounded edges 90 that result from the ion beam milling are now formed within the protective layer 100. Thus, the thickness T of the protective layer 100 is at least equal to the distance t (see FIG. 5) of the rounded edge effect 90 that the FIB tool creates. Additionally, the overall depth of milling conducted in the present invention is necessarily increased from D of the prior art by the thickness T of the protective layer to achieve a resulting pole tip 108 of the present invention (described in detail herebelow with the aid of FIG. 8) having the same vertical dimension D as the prior art pole tip depicted in FIG. 5. Following the FIB milling step, the protective layer 100 is removed from the head by such means as a chemical etch, burnishing or other generally known methods.

Figure 8:
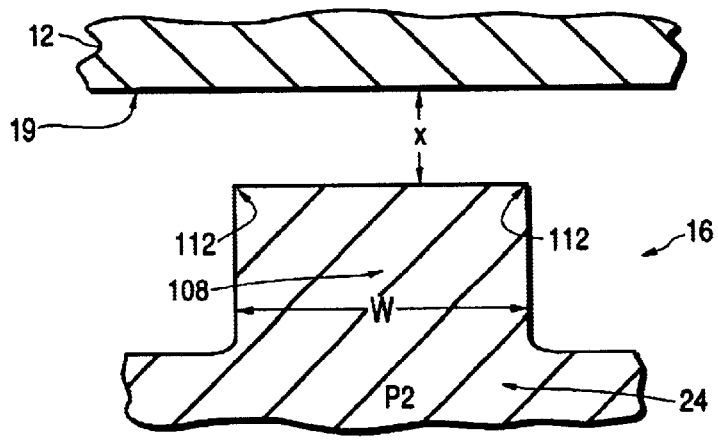
FIG. 8 is a further view of the pole tip of the present invention depicted in FIG. 7 having the milling layer removed.

A cross sectional view of the improved pole tip 108 of the head 16 of the present invention is depicted in FIG. 8 proximate the surface 19 of a magnetic media 12. As depicted therein, the pole tip 108 has generally square edges 112 which result in a uniform gap distance x throughout the entire width W of the pole tip 108. Also, although not shown, the P1 notches will also be formed with substantially square edges. As a result, the improved pole tip 108 produces the desired track width upon the media surface 19 with substantially reduced side writing as compared to the prior art pole tip depicted in FIG. 5. Due to the reduced side writing, data tracks on the media surface 19 can be written closer together, thereby increasing the TPI and the areal density of data written upon the media. Additionally, where the protective layer 100 of the present invention is utilized, the width W of the P2 pole tip can be reduced relative to the prior art, because edge rounding of the milled pole tip does not occur.

In a specific example of the present invention, as is known in the prior art, a 100 pico-Amp Ga+ion beam at 50 keV energy for a nominal dose 4.0 nC/micron$^2$ results in a pole tip rounding having a distance t of approximately 0.1 microns. Therefore, to counteract this ion beam rounding effect, a protective layer 100 of the present invention having a thickness T of at least approximately 0.1 microns is utilized. The protective layer 100 can be composed of various materials that are capable of protecting the edges of the pole tip while being easily removed from the pole tip following the FIB milling process, without contaminating the pole tip. A layer material such as a hardened photoresist is preferred, as the properties of such resists are well known in the head fabrication art, however materials such as tungsten, and platinum that form alloys with gallium ions of the FIB tool may be suitable.

The protective layer 100 of the present invention is preferably utilized where the wafer substrates containing a plurality of heads have been sliced into rows of heads, such that the heads can be more easily manipulated for individual sequential fabrication utilizing the FIB tool. A generally suitable range of FIB tool parameters includes a 10 pico-Amp to 30 nano-Amp Ga+ion beam at 50 keV energy with a dose in the range of 0.01 nC/micron$^2$ to 10 nC/micron$^2$. The tendency in the industry towards smaller write head features generally results in a tendency towards lower ion beam currents and doses. The utilization of the protective layer 100 of the present invention results in exceedingly square edges for the P2 pole tip as well as for notches in the P1 pole. Generally, the squareness of the P2 pole tip edges of the present invention will have a radius of curvature of from 0.10 nm to less than 100 nm depending upon the beam current and dosage levels, where the lower ion beam current and dosage levels generally result in substantially square edges having a radius of curvature of approximately 1 nm.

Most advanced FIB milling tools have the capability of depositing a substance upon a surface as well as removing material from a surface. Specifically, current FIB tools have the ability to deposit tungsten and/or platinum, typically as alloys with gallium where gallium ions are utilized in the deposition process. Therefore, in a two step process utilizing a FIB tool, the protective layer 100 of tungsten or platinum alloys with gallium can be deposited onto the pole tip surface utilizing the FIB tool, and thereafter the FIB tool can be utilized to mill the pole tip surface within the milling boxes.

Figure 9:
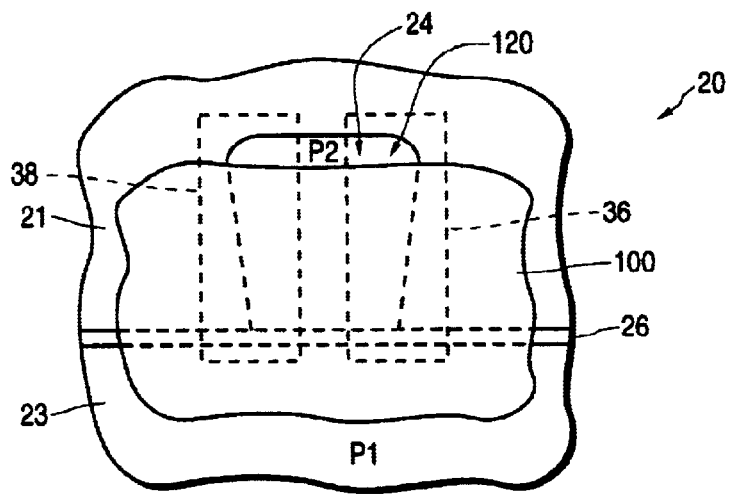
FIG. 9 is a top plan view of a preferred deposition pattern of the FIB milling layer of the present invention.

In attempting to perform the milling step of the present invention upon the protective layer 100, it can be difficult to accurately align the milling boxes 36 and 38 where the surface features of the pole tip are rendered invisible by the protective layer 100. To solve this problem, an upper portion 120 of the P2 pole tip 24 can be left uncovered during the protective layer deposition process as is depicted in FIG. 9. With a knowledge of the physical dimensions of the head 16, the milling boxes 36 and 38 can be oriented appropriately by the FIB tool operator based upon the visualization of the top portion 120 of the P2 pole tip. Improved accuracy of the FIB tool milling process of the present invention with the deposited layer 100 is thereby obtained.

While the present invention has been shown and described with reference to certain preferred embodiments, it is to be understood that those skilled in the art will no doubt devise alterations and modifications in form and detail which nevertheless include the basic spirit and scope of the invention. It is therefore intended that the following claims cover all such alterations and modifications.

What we claim is:

1. A method for manufacturing a magnetic head, comprising the steps of:
   depositing a thin film layer of material upon an ABS surface of a P2 pole tip of said head; wherein said P2 pole tip has a base portion that includes side edge portions, and an upper portion, and wherein said thin film layer of material is deposited upon said P2 pole tip such that said upper portion of said P2 pole tip is not covered by said material;
   milling portions of said thin film layer and portions of said P2 pole tip utilizing a focused ion beam (FIB) tool, wherein said portions of said P2 pole tip that are milled include said side edge portions of said base portion of said P2 pole tip; and
   removing said thin film layer of material from said head.

2. A method for manufacturing a magnetic head as described in claim 1 wherein milling boxes of said FIB tool are aligned upon said P2 pole tip through visualization of said upper portion of said P2 pole tip.

3. A method for manufacturing a magnetic head as described in claim 1 wherein said step of depositing the thin film layer of material includes covering portions of a P1 pole of the magnetic head with said material.

4. A method for manufacturing a magnetic head as described in claim 3 wherein portions of said P1 pole are milled by said FIB tool.

5. A method for manufacturing a magnetic head as described in claim 1 wherein said thin film layer is comprised of a hardened photoresist.

6. A method for manufacturing a magnetic head as described in claim 5 wherein said thin film layer of material is removed using a chemical formulation.

7. A method for manufacturing a magnetic head as described in claim 1 wherein said thin film layer of material is deposited utilizing said FIB tool.

8. A method for manufacturing a magnetic head, comprising the steps of:

forming a write head portion of the magnetic head upon a substrate surface such that said write head includes an air bearing surface (ABS) having an exposed P1 pole and an exposed P2 pole tip, said P2 pole tip having an upper portion and a base portion having side edge portions thereof;

depositing a thin film layer of material upon said P2 pole tip wherein said upper portion of P2 pole tip is not covered by said material;

aligning at least one milling box of a focused ion beam (FIB) tool upon said thin film layer above said P2 pole tip;

milling portions of said thin film layer and said side edge portions of said base portion of said P2 pole tip within said at least one milling box utilizing said FIB tool; and removing said thin film layer of material from said write head following said milling step.

9. A method for manufacturing a magnetic head as described in claim 8 wherein said P2 pole tip includes a base portion and an upper portion, and wherein said upper portion of said P2 pole tip is not covered by said layer of material during said step of depositing said thin layer of material.

10. A method for manufacturing a magnetic head as described in claim 8 wherein said step of aligning the milling boxes includes the step of visualization of upper portions of said P2 pole tip.

11. A method for manufacturing a magnetic head as described in claim 8 wherein said thin film layer of material is comprised of a hardened photoresist.

12. A method for manufacturing a magnetic head as described in claim 8 wherein portions of said P1 pole of said write head are covered by said thin film layer of material during said step of depositing the thin layer of material, and wherein said P1 pole includes a top edge portion that is disposed next to a write gap layer of the magnetic head, and wherein said top edge portion of said P1 pole is milled during said milling step.

13. A method for manufacturing a magnetic head as described in claim 8 wherein said thin film layer of material is removed using a chemical formulation.

14. A method for manufacturing a magnetic head as described in claim 8 wherein said thin film layer of material is deposited utilizing said FIB tool.

15. A method for manufacturing a magnetic head as described in claim 14 wherein said thin film layer material includes an element from the group consisting of tungsten, platinum, and gallium.

16. A method for manufacturing a magnetic head as described in claim 8 wherein said magnetic head is part of a row of magnetic heads that are sequentially milled by said FIB tool.

17. A method for manufacturing a magnetic head as described in claim 8 wherein said FIB tool provides a Ga+ ion beam having a current from 10 pico-Amps to 30 nano-Amps.

18. A method for manufacturing a magnetic head as described in claim 17 wherein said FIB tool provides a Ga+ ion beam having a nominal dose of from 0.01 nC/micron$^2$ to 10 nC/micron$^2$.

19. A method for manufacturing a magnetic head as described in claim 8 wherein said thin film layer is deposited in a thickness of approximately 0.1 microns.

20. A method for manufacturing a magnetic write head as described in claim 19 wherein said FIB tool provides a 100 pico-Amp Ga+ ion beam at 50 keV energy for providing a nominal dose of 4.0 nC/micron$^2$.

* * * * *